United States Patent
Fuehrer et al.

(10) Patent No.: US 6,920,218 B1
(45) Date of Patent: Jul. 19, 2005

(54) COMBINATION CLOCK AND CHARGE PUMP FOR LINE POWERED DAA

(75) Inventors: Timothy W. Fuehrer, Phillipsburg, NJ (US); Keith E. Hollenbach, Reading, PA (US); Donald R. Laturell, Allentown, PA (US); Steven B. Witmer, Sinking Spring, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/192,651

(22) Filed: Nov. 16, 1998

(51) Int. Cl.$^7$ .............................. H04M 1/00; H04M 9/00
(52) U.S. Cl. ............................. 379/399.01; 379/399.02; 379/400; 379/401
(58) Field of Search ........................... 379/399.01, 377, 379/373, 412, 413, 379, 399; 375/373; 327/156, 271, 272

(56) References Cited

U.S. PATENT DOCUMENTS

| | | | |
|---|---|---|---|
| 4,570,034 A | | 2/1986 | Serrano .................... 179/84 A |
| 5,028,925 A | | 7/1991 | Ferry et al. ................. 341/143 |
| 5,066,870 A | | 11/1991 | Kobatake ................. 307/296.1 |
| 5,436,587 A | * | 7/1995 | Cernea |
| 5,491,447 A | | 2/1996 | Goetschel et al. .......... 330/254 |
| 5,500,895 A | * | 3/1996 | Yurgelites ................... 379/412 |
| 5,600,551 A | * | 2/1997 | Luscher, Jr. |
| 5,654,984 A | * | 8/1997 | Hershbarger et al. ....... 375/257 |
| 6,020,773 A | * | 2/2000 | Kan et al. ................... 327/271 |
| 6,049,238 A | * | 4/2000 | Shimizu et al. ............. 327/156 |
| 6,081,586 A | * | 6/2000 | Rahamim et al. ......... 379/93.29 |
| 6,198,816 B1 | * | 3/2001 | Hein et al. .................. 379/373 |
| 6,385,235 B1 | * | 5/2002 | Scott et al. |

OTHER PUBLICATIONS

ICs for Communications, Analog Line Interface Solution, ALIS, PSB 4595 Version 2.0, PSB 4596 Version 2.1, Product Overview 08.97 [Note: Unable to Establish if This is Prior Art. Please Examine as Though it is Prior Art].

Analog Modem Front End Meets Many Telecom Standards, New Single Hardware Solution Eliminates The Need for Transformers, Saves Space, and Wears a Small Price Tag, Alfred Vollmer, Communications Technology, Electronic Design, Jul. 21, 1997.

* cited by examiner

*Primary Examiner*—Forester W. Isen
*Assistant Examiner*—Ramnandan Singh

(57) ABSTRACT

Disclosed is a method and apparatus which facilitates the use of existing power that is ordinarily unused or discarded to provide power to a telephone interface circuit when the circuit is in the on-hook state, thereby alleviating the need to use loop current to power the interface during the on-hook state. Existing clock signals are used to charge capacitors that are normally used for capacitive coupling of digital data across the high voltage isolation barrier. Although only small-value capacitors are needed for transmitting data across the capacitive interface, larger-value capacitors are used and are configured to form a charge pump to generate power to the interface at all times. Thus the interface always has a steady source of power available for use, including during the on-hook state for powering circuitry that can detect, modulate, and transmit on-hook signals across the capacitive interface.

17 Claims, 2 Drawing Sheets

US 6,920,218 B1

COMBINATION CLOCK AND CHARGE PUMP FOR LINE POWERED DAA

CROSS-REFERENCE TO RELATED APPLICATIONS

This application is related to an application entitled "Line Interface Circuit with Event Detection Signaling" and an application entitled "Event Detection Circuit", both of which are assigned to the assignee of the present invention and both of which were filed concurrently with this application.

FIELD OF THE INVENTION

This invention relates generally to the field of telecommunications networks, and more particularly, to a differential capacitively coupled clock used as a charge pump to provide power to a circuit during the on-hook state.

BACKGROUND OF THE INVENTION

Telephone networks comprise a series of interconnected subsystems that are linked together at points called interfaces. These interfaces provide a link between old and new equipment and allow for simplified design and maintenance. A local loop is an example of an interface that connects a subscriber's telephone set and a central office.

The isolation between the line side (the side having a direct connection to the central office) and the computer side (the side having a direct connection to the user premises equipment) is often accomplished within the interface circuit. A modem is an example of an interface circuit that may include circuitry that provides electrical isolation from the line in addition to the signal modulation and demodulation function of the modem. Isolation transformers, optical coupling, and capacitive coupling are all examples of known methods of isolating the line side from the computer side.

FIG. 1 is a block diagram of a typical telecommunication system 5 showing the connection between a subscriber and a central office that controls the telecommunication system. Central-office equipment 10 on the line side 15 of the telecommunication system 5 is connected to user device 20 (e.g., telephones or computer terminals) on the computer side 25 of the telephone system 5 via an interface circuit 30.

The DC power inherent in a telephone line provides a convenient source of power, but there are often limitations and restrictions which limit the ability of a modem to derive power from the telephone line. For instance, present regulations in the United States require that significant current may only be drawn from the telephone line when the telephone or modem is in an off-hook or active condition.

The U.S. Federal Communication Commission (FCC) and other counterpart regulatory agencies in other countries also require electrical isolation between the line side and the user devices on the computer side. Electrical isolation protects the line side from damage transmitted from the computer side and vice-versa. Many components (e.g., data access arrangements (DAAs) or CODEC's) of telephone interface circuits are PSTN line-powered circuits, i.e. they operate from PSTN line current because they are isolated from the low voltage power supplies. The DAA must provide isolation between the low-voltage computer side and the high-voltage line side. Because the line-powered interface circuits are isolated from low voltage power supplies and the amount of line current available to operate the interface circuits is severely limited during the on hook state by PSTN regulations, the on-hook functions are difficult to perform without the use of expensive transformers and/or optocouplers.

When a circuit on the line side is placed in the "on-hook" state (e.g., a telephone receiver on the computer side is placed in its cradle) the local loop is opened and almost all of the power to the interface circuit is cut off. Activating the DAA or CODEC requires that some power be drawn from the local loop or from another source.

While in the on-hook state a small amount of current (idle-state loop current or leakage current) can be drawn for a short period of time from the TIP/RING line to operate the DAA or CODEC. Typically, the maximum AC loop current that can be drawn from the TIP/RING line is about 500 $\mu$A DC during ringing and about 200 $\mu$A during caller ID transmission. The maximum amount of leakage current allowed is only 7 $\mu$A of DC current. Accordingly, complicated power management techniques have been implemented which must be used so that the power for the DAA or CODEC is minimized and is allocated only when it is clear that the power is necessary. For example, systems have been developed that will operate in a low power mode (e.g., 20 $\mu$A) during a discrimination stage where a determination is made that a real event (as opposed to line noise which appears to be an event) has occurred, and then switch to a medium power mode (e.g., 50 $\mu$A) during a transmission mode where the event data is transmitted across the capacitive interface. Since there is so little current available during the on-hook state, it is extremely difficult to power the required circuits needed to perform on-hook functions.

In view of the tight limitations relating to the drawing of power, it would be desirable to develop a power source that would not derive power from leakage current, idle-state loop current and that would instead utilize otherwise "discarded" power to isolated circuits.

SUMMARY OF THE INVENTION

The present invention is a method and apparatus which facilitates the use of existing power that is ordinarily unused or discarded to provide power to an interface during the on-hook state, thereby alleviating the need to use loop current to power the interface during the on-hook state. The present invention utilizes existing clock signals to charge capacitors that are normally used for capacitive coupling of digital data across the high voltage isolation barrier. Although only smaller capacitors are needed for transmitting data across the capacitive interface, larger capacitors are used and are configured to form a charge pump to generate power to the interface at all times. Thus the interface always has a steady source of power available for use, including during the on-hook state, for powering circuitry that can detect, modulate, and transmit on-hook signals across the capacitive interface. The amount of current available to the interface from the charge pump is at least one milliamp or more, a dramatic increase over the typical 2 $\mu$A of current that is only sporadically available from leakage current during the on-hook state.

DETAILED DESCRIPTION OF THE INVENTION

Figure 1:
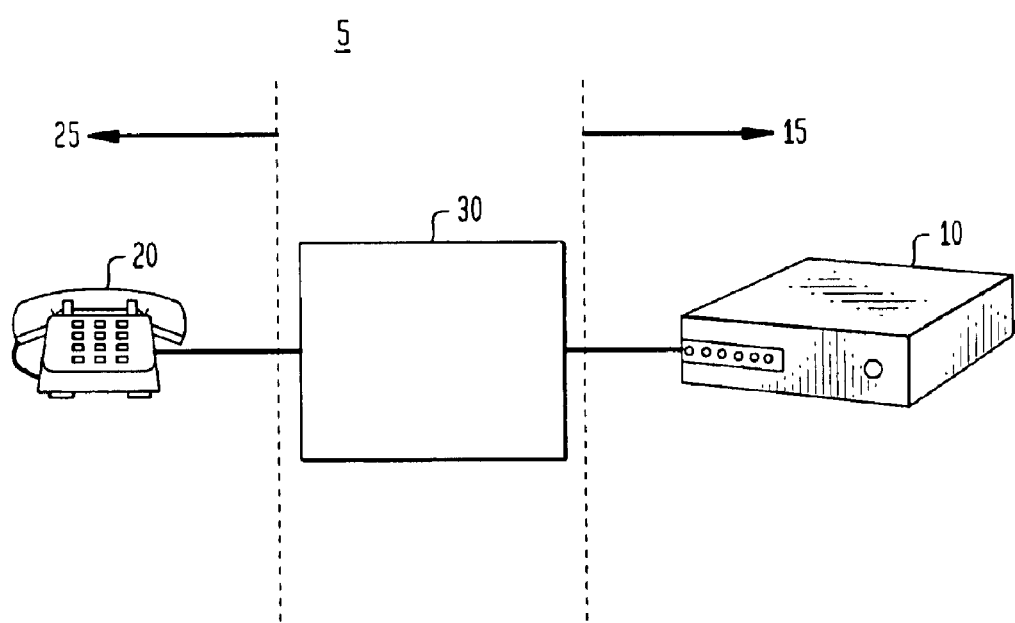
FIG. 1 is a block diagram of a typical telecommunications system in which the present invention may be utilized.
Figure 2:
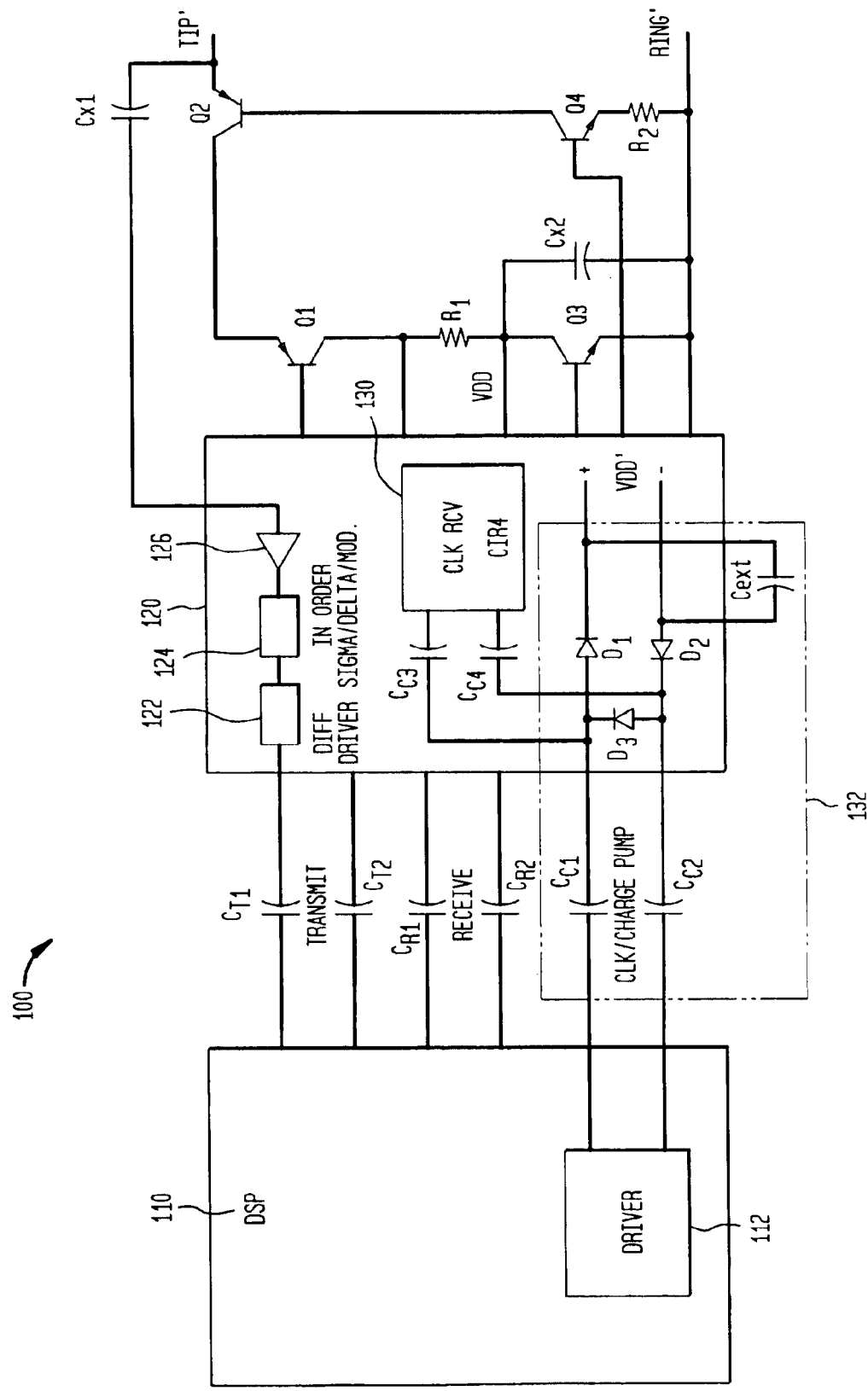
FIG. 2 is a block diagram of the interface circuit of the present invention.

As described below in more detail and in accordance with an embodiment of the invention shown in FIG. 2, a network interface circuit 100 comprises a DSP 110 and a DAA 120 connected to a telephone line via a switch hook comprising transistors Q2 and Q4 and resistor R2. DSP 110 includes a differential driver 112 which provides a differential clock signal to the DAA 120. Although the embodiment described with respect to FIG. 2 shows a DSP 110 connected to DAA 120, it is understood that any device having a driver circuit such as a clock generator could be utilized instead of a DSP, depending on the needs of the user. For example, it is contemplated that a microprocessor, an ASIC, or a CPU could be used in place of the DSP to provide the means for developing a charge across the capacitive elements of the interface.

The DAA 120 includes a differential driver circuit 122, a Sigma-Delta analog-to-digital converter 124 and Caller ID and Ringing Preamplifier 126, all of which are coupled in series to the TIP/RING line via a capacitor $C_{X1}$. Capacitor $C_{X1}$ couples the ringing and caller ID signal to the DAA during the on-hook state. When the system is in the on-hook state, the switch hook of the telephone is open (Q2 not conducting) and line current is not available for use by the DAA. As described below, however, the DAA is powered by a charge pump 132 and thus does not need the line current to operate. Capacitor $C_{X1}$ is optimally a 20 pF to 50 pF capacitor. When the switch hook is closed, current flows through transistors Q2 and Q1. The AC signal present during the off-hook state is also coupled in the DAA through a different path (not shown). Modem data is transmitted during the off-hook state but the current is pulled directly from the telephone line, so the charge pump is not needed.

A charge pump 132 comprises a first capacitive element (charge pump capacitors $C_{c1}$ and $C_{c2}$), a second capacitive element (external capacitor $C_{ext}$), and a rectifying element (diodes D1, D2, and D3). Also included in the DAA 120 is clock regeneration circuit 130. The clock regeneration circuit 130 is preferable because the charge pump 132 distorts the driver waveform across diode D3, shifting the DC level. By capacitively coupling the differential signal across diode D3, the DC signal is removed. The clock regeneration circuit then "regenerates" a new clean clock signal synchronized to the driver pulses. Capacitors $C_{C3}$ and $C_{C4}$ provide AC coupling for the clock regeneration circuit 130. Diodes D1, D2 and D3 rectify and double the clock signals for the purpose of charge pumping. External capacitor $C_{EXT}$ stores energy for the DAA 120 transmitted across the charge pump capacitors $C_{c1}$ and $C_{c2}$ and rectified by diodes D1, D2, and D3. The charge on capacitor $C_{EXT}$ is replenished by the charge pump capacitors $C_{c1}$ and $C_{c2}$. $C_{EXT}$ enables the peak current pulled from the charge pump 132 to be larger than the average current supplied by the charge pump 132.

Coupled between the DSP 110 and the DAA 120 are a series of capacitors $C_{T1}$, $C_{T2}$, $C_{R1}$, $C_{R2}$, in addition to charge pump capacitors $C_{C1}$, and $C_{C2}$. Capacitors $C_{T1}$ and $C_{T2}$ capacitively couple the transmit signal (a digital signal) to DAA 120 from the DSP 110. Capacitors $C_{R1}$ and $C_{R2}$ capacitively couple the received signal from DAA 120 to the DSP 110. Capacitors $C_{C1}$ and $C_{C2}$ transmit the clock signal and power to the DAA 120. In contrast to the other capacitors in the circuit, which are relatively small (e.g., 5 pF), the charge pump capacitors $C_{C1}$ and $C_{C2}$ are significantly larger (e.g. 100 pF). By increasing the size of the capacitors $C_{C1}$ and $C_{C2}$, more charge can be transferred per clock cycle and the desirable results described above can be achieved.

The charge pump 132 operates as follows. The driver on the DSP 110 outputs two square wave pulse streams. The two pulse streams are out of phase by 180°. Thus, when the output voltage of capacitor $C_{C2}$ pulses high, the output voltage of capacitor $C_{C1}$ pulses low. During the transition between states current is transferred from $C_{C2}$ to $C_{C1}$ through diode 3. When the voltage output from capacitor $C_{C1}$ pulses high and the voltage output from capacitor $C_{C2}$ pulses low, the charge on capacitor $C_{C1}$ is transferred to VDD through diode D1 and returns through diode D2. Each cycle period of the driver pulse transfers charge to the load across VDD+. The time average current is the average charge per cycle multiplied by 1/T where T is the period of the driver pulse train. The time average current in steady state (when the load across VDD+ is charged up to VDD+) is calculated by the formula $(C_{C2}/T)*2*V_p-3*VD-VDD)$ where $V_p$ is the peak pulse train voltage (325 volts), VD is the diode forward bias voltage (0.7 volts), VDD is the steady state load voltage (approximately 2.7 volts in the preferred embodiment).

Since current is always available, there is no need to determine the nature of the event before powering up the DAA. This preliminary discrimination step is only required if there is a restriction on the current level. Since the circuitry of the present invention provides this additional power, all signals can be sent directly to the DSP and the DSP can make a decision as to whether or not it wants to process the signal as a real event or disregard the signal as a noise event. Alternatively, the present invention could be used with an event discrimination circuit, thereby producing an even more efficient interface because the additional current available would only be used on an as-needed basis, freeing up the added current for use elsewhere.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. A fully differential interface circuit, comprising:
   a digital signal processor (DSP) having a clock generator generating a clock signal having a voltage;
   a data access arrangement (DAA) having a clock regeneration element; and
   a charge pump, coupled between said DSP and said DAA, said charge pump providing operating power to said DAA, said charge pump doubling the voltage of said clock signal, and said clock regeneration element regenerating a clock signal that is essentially identical to the clock signal generated by said clock generator.

2. An interface circuit as set forth in claim 1, wherein said charge pump comprises:
   a first capacitive element having an input side connected to said DSP and an output side connected to said DAA;
   a second capacitive element having an input and an output each connected to said DAA; and
   a rectifying element coupled between the output side of said first capacitive element and said second capacitive element, said rectifying element receiving said clock signal from said DSP and doubling the voltage of said clock signal before passing said clock signal to said DAA.

3. An interface circuit as set forth in claim 2, wherein said DSP includes a clock generator generating first and second clock pulses out of phase with each other by 180° and wherein said first capacitive element comprises:

a first capacitor coupled to receive said first clock pulse; and a second capacitor coupled to receive said second clock pulse, wherein said first capacitive element continuously outputs a positive output voltage to said rectifying element.

4. An interface circuit as set forth in claim 3, wherein said rectifying element comprises a diode rectifier.

5. An interface circuit as set forth in claim 4, wherein said clock regeneration element is connected in parallel with said rectifying circuit to remove DC level shift and regenerate clock pulses for use by the DAA which are essentially identical to the clock pulses output by said clock generator.

6. An interface circuit as set forth in claim 5, wherein said second capacitive element comprises a storage capacitor which stores the charge transferred by said first and said second capacitors.

7. An interface circuit as set forth in claim 2, wherein said first capacitive element has a capacitance sufficient to create said charge pump.

8. An interface circuit as set forth in claim 2, wherein the first capacitive element has a capacitance value of approximately 100 pF.

9. A method of providing power to a data access arrangement (DAA) in an interface circuit of a telecommunication network when a telephone line connected to said interface circuit is in the on-hook state, said interface circuit including a digital signal processor (DSP) having a clock generator, said method comprising the steps of:

inserting a charge pump between said DSP and said DAA;

generating a power signal, having a voltage, across said charge pump by inputting the output of said clock generator to said charge pump;

doubling the voltage of said power signal and storing said generated power signal for use by said interface; and regenerating a clock signal essentially identical to said output of said clock generator.

10. A fully differential interface circuit, comprising:

a driver circuit for developing a charge across capacitive elements of said interface circuit, said charge having a voltage, said driver circuit including a clock generator generating a clock signal;

a data access arrangement (DAA) having a clock regeneration element; and a charge pump, coupled between said DAA and said driver circuit, said charge pump providing operating power to said DAA, said charge pump doubling the voltage of said charge and passing said doubled voltage to said DAA to provide said operating power, and said clock regeneration element regenerating a clock signal that is essentially identical to the clock signal generated by said clock generator.

11. An interface circuit as set forth in claim 10, wherein said charge pump comprises:

a first capacitive element having an input side connected to said driver circuit and an output side connected to said DAA;

a second capacitive element having an input and an output each connected to said DAA; and a rectifying element coupled between the output side of said first capacitive element and said second capacitive element, said rectifying element receiving said charge from said driver circuit and doubling the voltage of said charge before passing said charge to said DAA.

12. An interface circuit as set forth in claim 11, wherein said clock signal generated by said clock generator comprises first and second clock pulses out of phase with each other by 180° and wherein said first capacitive element comprises:

a first capacitor coupled to receive said first clock pulse; and a second capacitor coupled to receive said second clock pulse, wherein said first capacitive element continuously outputs a positive output voltage to said rectifying element.

13. An interface circuit as set forth in claim 12, wherein said rectifying element comprises a diode rectifier.

14. An interface circuit as set forth in claim 13, wherein said clock regeneration element is connected in parallel with said rectifying circuit to remove DC level shift and regenerate clock pulses for use by the DAA which are essentially identical to the clock pulses output by said clock generator.

15. An interface circuit as set forth in claim 14, wherein said second capacitive element comprises a storage capacitor which stores the charge transferred by said first and said second capacitors.

16. An interface circuit as set forth in claim 11, wherein the first capacitive element has a capacitance sufficient to create said charge pump.

17. An interface circuit as set forth in claim 11, wherein the first capacitive element has a capacitance value of approximately 100 pF.

* * * * *